(12) United States Patent
Thompson

(10) Patent No.: US 11,499,658 B2
(45) Date of Patent: Nov. 15, 2022

(54) ROTATABLE JOINT

(71) Applicant: Inovance, Inc., Pleasant Prairie, WI (US)

(72) Inventor: Donovan S. Thompson, Racine, WI (US)

(73) Assignee: Inovance, Inc., Pleasant Prairie, WI (US)

( * ) Notice: Subject to any disclaimer, the term of this patent is extended or adjusted under 35 U.S.C. 154(b) by 392 days.

(21) Appl. No.: 15/394,438

(22) Filed: Dec. 29, 2016

(65) Prior Publication Data

US 2018/0187806 A1 Jul. 5, 2018
US 2022/0042631 A9 Feb. 10, 2022

Related U.S. Application Data

(63) Continuation of application No. 14/285,366, filed on May 22, 2014, now abandoned.

(60) Provisional application No. 61/826,350, filed on May 22, 2013.

(51) Int. Cl.
*F16L 23/00* (2006.01)
*F16L 27/08* (2006.01)
*F16L 23/10* (2006.01)

(52) U.S. Cl.
CPC ............ *F16L 27/082* (2013.01); *F16L 23/10* (2013.01); *F16L 2201/30* (2013.01)

(58) Field of Classification Search
CPC ... F16L 27/082; F16L 2201/30; F16L 23/167; F16L 23/162
See application file for complete search history.

(56) References Cited

U.S. PATENT DOCUMENTS

| | | | |
|---|---|---|---|
| 317,794 A | * | 5/1885 | Jackson ................ F16L 23/167 |
| | | | 285/13 |
| 1,301,453 A | | 4/1919 | Kendall |
| 1,302,314 A | | 4/1919 | Cornell |
| 2,384,360 A | | 9/1945 | Allen |
| 2,486,451 A | | 11/1949 | Warren |
| 2,557,495 A | | 6/1951 | Bily |
| 2,705,651 A | | 4/1955 | Myers |
| 2,770,475 A | | 11/1956 | Raferty |
| 3,485,516 A | * | 12/1969 | Kell ........................ F16L 23/12 |
| | | | 285/123.1 |
| 3,879,065 A | | 4/1975 | Kobayashi |

(Continued)

FOREIGN PATENT DOCUMENTS

| | | | |
|---|---|---|---|
| EP | 1050699 A2 | * 11/2000 | ............... F16J 13/02 |
| WO | WO-2012038799 A1 | * 3/2012 | ........... E21B 33/043 |

*Primary Examiner* — Matthew Troutman
*Assistant Examiner* — James A Linford
(74) *Attorney, Agent, or Firm* — Jansson Munger McKinley & Kirby Ltd.

(57) ABSTRACT

An improved rotatable joint for fluid flow therethrough having (a) a housing, (b) a tube fitting axially aligned with the housing, (c) a bearing around the tube fitting and configured to permit relative rotation of the housing and tube fitting, and (d) a seal between the housing and tube fitting, the improvement wherein (i) the housing includes one or more leak detection ports and (ii) the rotatable joint is configured such that any leakage of fluid through the rotatable joint flows first around the seal to the bearing and then through one or more of the leak detection ports to the atmosphere.

14 Claims, 8 Drawing Sheets

(56) References Cited

U.S. PATENT DOCUMENTS

| | | | |
|---|---|---|---|
| 3,889,983 A * | 6/1975 | Freize | F16L 27/0828 |
| | | | 285/13 |
| 4,531,532 A | 7/1985 | Zimmerly | |
| 5,393,104 A | 2/1995 | Zornow | |
| 5,570,911 A * | 11/1996 | Galle | F16L 23/04 |
| | | | 285/24 |
| 5,996,966 A | 12/1999 | Zimmerly | |
| 6,079,752 A | 6/2000 | Meisinger | |
| 6,220,636 B1 | 4/2001 | Veloskey et al. | |
| 7,025,078 B2 | 4/2006 | Lukach, Jr. et al. | |
| 7,396,052 B2 | 7/2008 | Johnson, Jr. | |
| 8,240,718 B2 | 8/2012 | Morton et al. | |
| 2007/0051164 A1* | 3/2007 | Van Winkle | G01M 3/2853 |
| | | | 73/37 |
| 2010/0059985 A1 | 3/2010 | Nielson | |
| 2011/0309616 A1 | 12/2011 | Mager et al. | |
| 2014/0346771 A1* | 11/2014 | Thompson | F16L 23/10 |
| | | | 285/281 |
| 2016/0153596 A1* | 6/2016 | Ungchusri | E21B 17/05 |
| | | | 285/93 |

\* cited by examiner

ROTATABLE JOINT

RELATED APPLICATIONS

This application is a continuation of application Ser. No. 14/285,366 filed on May 22, 2014 which claims priority as a non-provisional patent application to provisional application Ser. No. 61/826,350 filed May 22, 2013, which is incorporated herein by reference in its entirety.

FIELD OF THE INVENTION

This invention is related generally to the field of process systems which require that sanitary conditions be maintained within piping systems which transfer product from one or more product sources to one or more product destinations, and more specifically to rotatable joints within such systems.

BACKGROUND OF THE INVENTION

Between transfers of product in sanitary process systems, it may be necessary to disconnect a piping system from either or both of the product source most recently used or the product destination most recently used, and to clean the piping system of any residual product left from the most recent transfer. Where a different product is to be transferred, the piping system must be cleaned of any residual product between product transfers.

Some sanitary process systems require fluids to flow from one source through a piping system to multiple destinations or from multiple sources to a single destination or to multiple destinations. Rigid tube or pipe connections typically do not allow the flexibility of delivering such fluid to or from multiple sources or destinations without disconnecting and reconnecting the piping system, without the need for additional tubes/pipes, fittings or directional valves and/or without cleaning the tubes or pipes between transfers to the respective destinations. Such cleaning can become costly and may impede the process itself because of a need for disconnection, manual cleaning, and reconnection of the pipes in order to maintain sanitary conditions. Thus, a piping system which accommodates a clean-in-place process is highly desirable.

In some allegedly sanitary process systems, the materials can allow for surfaces which are porous, which thus become potential sites for retention of residual product or for bacteria growth. Other allegedly sanitary process systems may contain material which can leach potential deleterious substances into the product.

Some allegedly sanitary process systems contain crevices which cannot be adequately cleaned in place, thus requiring the respective piping systems to be disassembled and manually cleaned before they can be used again.

Some allegedly sanitary process systems are constructed using materials which are not acceptable as sanitary or for use in food-grade or pharmaceutical-grade systems and so may not be acceptable for use to transfer products which need to be maintained in such sanitary conditions.

Other process systems may include acceptable materials but are configured such that such process systems do not allow for cleaning the piping system in place, i.e., without disassembling the piping system.

Currently there are no known sanitary rotatable joints which allow the user to perform sanitary transfer functions and to clean the piping system in place, including one or more rotatable joints, while the piping system is still connected to the process system.

OBJECTS OF THE INVENTION

Accordingly, there is a need for a rotatable joint which can rotate while the piping system is generally in place, but wherein at least one of the pipes joined to the rotatable joint can be rotated with respect to at least one other of the pipes joined to the rotatable joint.

There is also a need for such a rotatable joint which can be cleaned in place.

There is further a need for such a rotatable joint which can be cleaned in place and wherein the piping system can subsequently pass any and all requirements for a food-grade or pharmaceutical grade sanitary system.

These and other needs are alleviated, or at least attenuated, or partially or completely satisfied, by novel products, systems, and methods of the invention.

SUMMARY OF THE INVENTION

The present invention is an improved rotatable joint for fluid flow therethrough which has (a) a housing, (b) a tube fitting axially aligned with the housing, (c) a bearing around the tube fitting and configured to permit relative rotation of the housing and tube fitting, and (d) a seal between the housing and tube fitting. The improvements to the rotatable joint are that (i) the housing includes one or more leak detection ports and (ii) the rotatable joint is configured such that any leakage of fluid through the rotatable joint flows first around the seal to the bearing and then through one or more of the leak detection ports to the atmosphere.

In preferred embodiments, the housing includes a housing seal surface, the tube fitting includes a tube-fitting seal surface, the seal includes a fluid-flow side and an atmosphere side, and the housing and tube fitting are configured such that the housing seal surface and tube-fitting seal surface form a circumferential gap therebetween at the fluid-flow side of the seal, such that a localized line of turbulence is created about the circumferential gap during cleaning-in-place. In some of these embodiments, the housing includes a chamfer adjacent to the housing seal surface such that the chamfer forms a portion of the circumferential gap which narrows toward the seal. Further, in some of these embodiments, the circumferential gap is between 0.01 and 0.04 inches at its narrowest point, and sometimes more preferably about 0.015 inches at its narrowest point.

In some preferable embodiments, the bearing includes (a) an outer bearing surface of the tube fitting, (b) an inner bearing surface of the housing, and (c) a first bearing element positioned between the outer bearing surface of the tube fitting and the inner bearing surface of the housing. In some of these embodiments, the diameter of the outer bearing surface of the tube fitting is at least as large as the diameter of the seal, and in some embodiments, the first bearing element is of polymeric material.

In some preferred embodiments, the bearing further includes (a) an upper bearing surface of the tube fitting substantially perpendicular to the outer bearing surface of the tube fitting, (b) an upper bearing surface of the housing substantially perpendicular to the inner bearing surface of the housing, (c) a second bearing element configured and positioned to contact both the upper bearing surface of the tube fitting and the upper bearing surface of the housing, and (d) a cap surrounding the second bearing element. In some of these embodiments, the second bearing element is made of polymeric material, and in some embodiments, the second bearing element includes a cut to facilitate installation. Further, some embodiments include a closure surrounding the second bearing element and the housing and holding the cap on the joint, and in some such embodiments, the first and second bearing elements are a unitary bearing element. In some embodiments which include the unitary bearing, the unitary bearing element includes a cut to facilitate installation, and in some embodiments, the unitary bearing element is of polymeric material.

BRIEF DESCRIPTION OF THE DRAWINGS

Illustrative embodiments of the invention are described hereinafter, by way of example only, with reference to the accompanying drawings.

Figure 1:
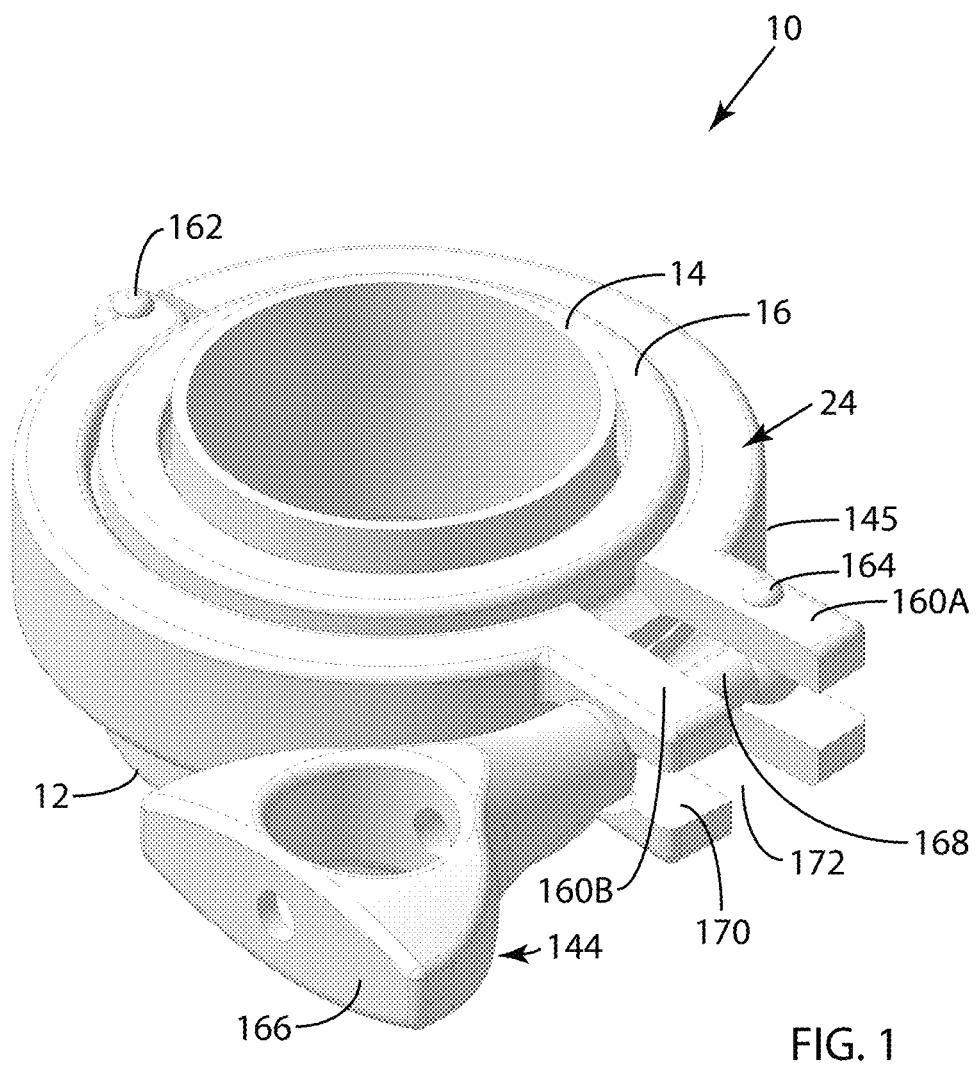
FIG. 1 shows a pictorial view of an assembled rotatable joint of the invention having a straight connector at the top of the tube fitting.

The invention is not limited in its application to the details of construction, to the arrangement of the components, or to the methods of construction set forth in the following description or illustrated in the drawings. The invention is capable of other embodiments or of being practiced or carried out in various other ways. Also, it is to be understood that the terminology and phraseology employed herein is for purpose of description and illustration and should not be regarded as limiting. Like reference numerals are used to indicate like components.

DETAILED DESCRIPTION OF PREFERRED EMBODIMENTS

A rotatable joint 10 of the invention, as illustrated in FIGS. 1-4, includes a housing 12, a tube fitting 14, a cap 16, a cap bearing element 18, a housing bearing element 20, a seal 22, and a clamp-type closure 24.

Figure 3:
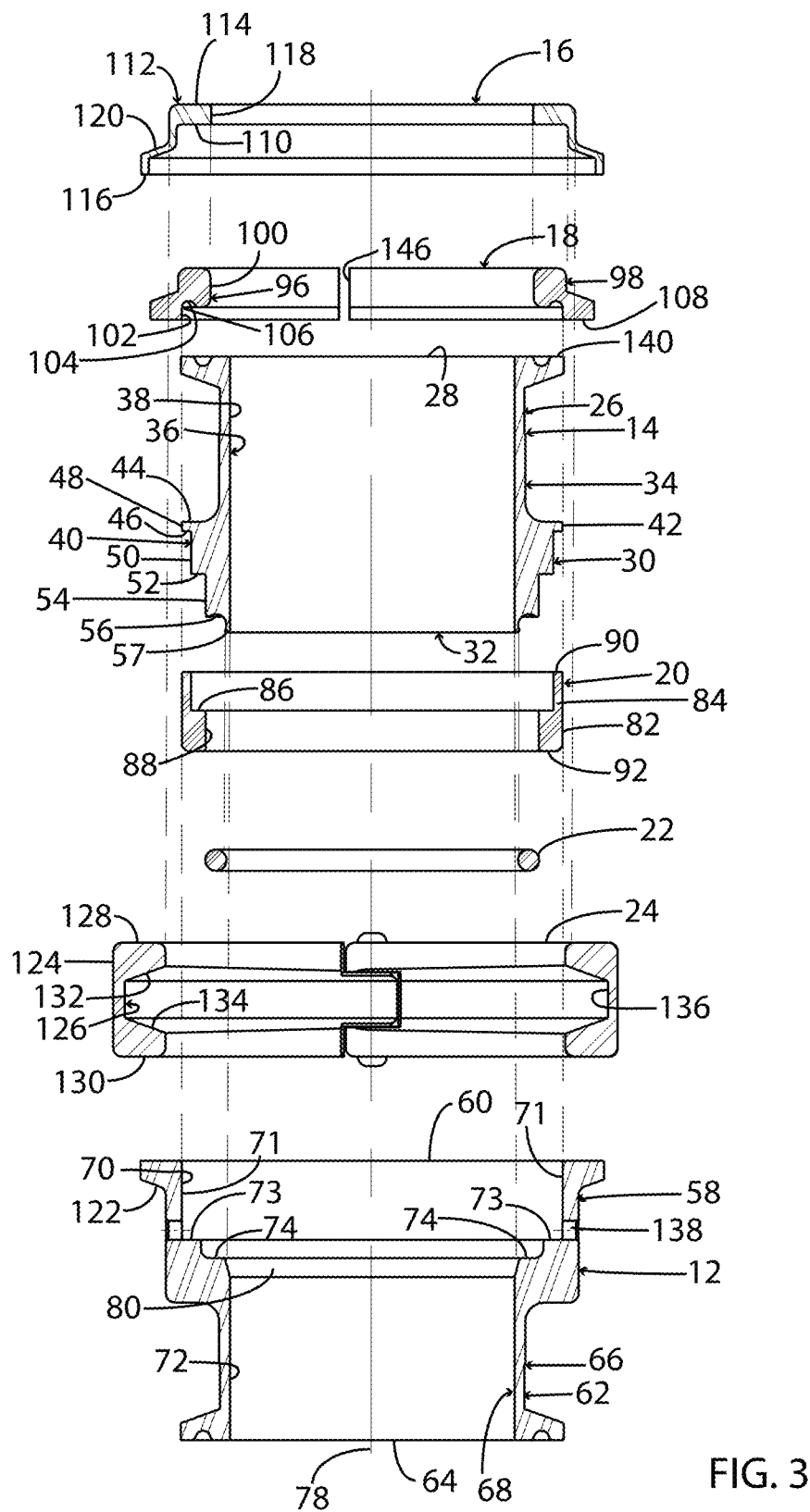
FIG. 3 is a cross-section elevation view of a rotatable joint as in FIGS. 1 and 2, with flanges added to the housing and tube fitting.
Figure 4:
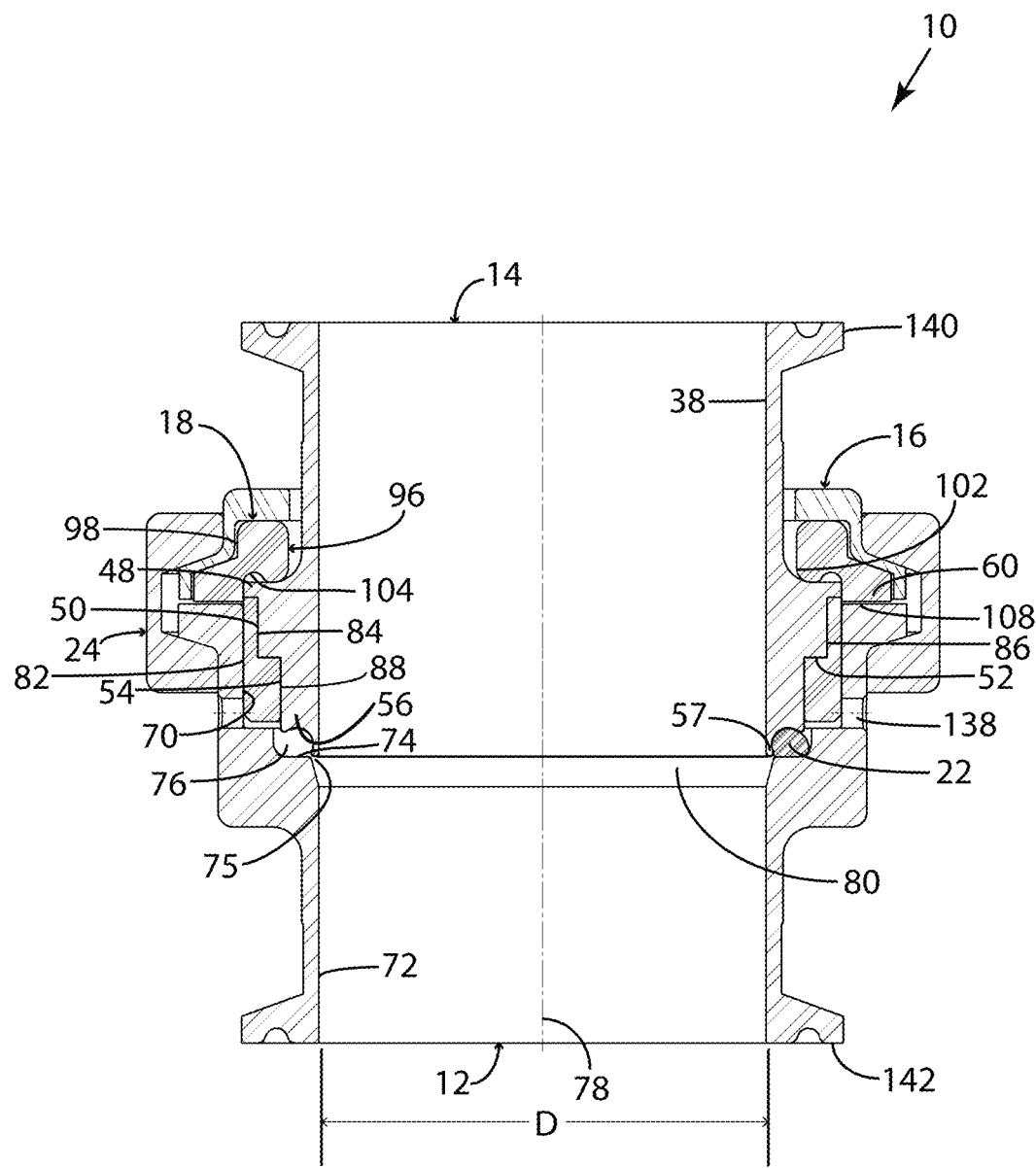
FIG. 4 is a cross-section of the rotatable joint of FIG. 3, showing the joint assembly before final sealing pressure is applied, with the seal shown on only one side of the rotatable joint.

Referring to FIGS. 3 and 4, tube fitting 14 has a generally tubular form, including an outer perimeter, an inner perimeter, and a circumference extending thereabout. Tube fitting 14 has an upper portion 26, an upper end 28 at the top of tube fitting 14, a lower portion 30, a lower end 32 at the bottom of tube fitting 14, an outer surface 34, and an inner surface 36. Inner surface 36 includes a fluid-contacting surface 38 which extends from the upper end of tube fitting 14 to the lower end of tube fitting 14.

The bottom portion 40 of outer surface 34 of tube fitting 14 which is at lower portion 30 extends generally outwardly from the portion of outer surface 34 which is at upper portion 26. Bottom portion 40 includes an outwardly-extending flange 42, extending in a direction generally perpendicularly away from inner surface 36. Flange 42 has a top surface 44, a bottom surface 46, and an outwardly-directed remote circumferential surface 48.

Outer surface 34 extends downwardly from flange bottom surface 46 at a generally constant diameter along a first lower tube fitting bearing surface 50, to an inward step 52. From inward step 52, outer surface 34 extends downwardly at a generally constant diameter along a second lower tube fitting bearing surface 54 which ends at a seal surface 56 proximate the lower end of tube fitting 14. Seal surface 56 is defined by an annular, downwardly-facing recess proximate the lower end of tube fitting 14. A downwardly-directed, circumferentially-extending, finger 57 is disposed between a lower portion of fluid-contacting surface 38 of tube fitting 14 and an inwardly disposed, outwardly-facing, portion of seal surface 56.

Housing 12 has a generally tubular form, including an outer perimeter, an inner perimeter, and a circumference extending thereabout. Housing 12 has an upper portion 58, an upper end 60 at the top of housing 12, a lower portion 62, a lower end 64 at the bottom of housing 12, an outer surface 66, and an inner surface 68. Both the inner and outer surfaces of housing 12, at upper portion 58, generally extend radially outwardly from the respective inner and outer surfaces of housing 12 at lower portion 62.

Inner surface 68 includes an inner-facing bearing surface 70 generally coincident with upper portion 58 of housing 12, a fluid-contacting surface 72 generally coincident with lower portion 62 of housing 12, and a housing seal surface 74 located between bearing surface 70 and fluid-contacting surface 72. Bearing surface 70 includes a radial bearing surface element 71 and an axial step bearing surface 73. Seal surface 74 typically borders, or is close to, the top of fluid-contacting surface 72 and step bearing surface element 73 and faces seal surface 56 on tube fitting 14. Bearing surfaces 70 and 56 collectively define a seal cavity 76 therebetween as illustrated at the left side of the assembly in FIG. 4.

Lower portion 30 of tube fitting 14 is received in upper portion 58 of housing 12 such that the fluid-contacting surfaces 38 and 72 are generally aligned with each other about a common longitudinal axis 78.

Referring to FIG. 4, starting at lower end 62 of housing 12, fluid-contacting surface 72 extends upwardly at a generally constant diameter D to a point toward the upper end of fluid-contacting surface 72. Toward the upper end of fluid-contacting surface 72, the fluid-contacting surface is chamfered to flare outwardly to the top of the fluid-contacting surface. Chamfer 80 as illustrated represents about 12 percent of the height of fluid-contacting surface 72. Chamfer 80 may occupy as little as about 3 percent or up to about 25 percent of the height of fluid-contacting surface 72. The angle of chamfer 80 relative to longitudinal axis 78 is typically about 20 degrees and can vary from about 10 degrees to about 45 degrees.

The purpose of chamfer 80 is to provide a zone of low pressure at the area of seal 22 in order to impede accumulation of residual product or other contaminants at seal 22 during a product transfer operation, and to facilitate removal of any such residual product or other contaminants during a clean-in-place operation. Accordingly, the height of chamfer 80, and its angle based on the direction of longitudinal axis 78, depend on the diameter and length of housing 12, as well as on the types of product contemplated to be transferred through rotatable joint 10 and the contemplated transfer pressures.

A further purpose of the chamfer is to provide a circumferentially-extending lateral gap 75 between the top of fluid-contacting surface 72 and finger 57, namely a clearance between housing 12 and transfer fitting 14.

Seal 22 is disposed in seal cavity 76 and is retained in cavity 76 between respective concave seal surfaces 56 and 74. In the illustrated embodiment, seal 22 is a rubber O-ring which extends about the entire annulus of the joint, in cavity 76, both about the annulus of tube fitting 14 and about the annulus of housing 12 at cavity 76. The rubber in seal 22 is food grade or pharmaceutical grade to the extent needed for the amount of contact seal 22 will have with fluids which are contemplated to be transferred through rotatable joint 10. Seal 22 is sized and configured so as to provide a leakproof seal between seal surfaces 56 and 74 when tube fitting 14 and housing 12 are urged toward each other by closure 24.

Housing bearing element 20 is disposed in the space between upper portion 58 of housing 12 and lower portion 30 of tube fitting 14. Housing bearing element 20 has an outer-facing bearing surface 82, an upper inner-facing bearing surface 84, a step surface 86, a lower inner-facing bearing surface 88, an upper bearing surface 90, and a lower bearing surface 92. Outer-facing bearing surface 82 bears radially on radial bearing surface 70 of housing 12. Inner-facing bearing surfaces 84 and 88 bear radially on radial bearing surfaces 50 and 54 of tube fitting 14. Step bearing surface 86 can optionally bear axially on step 52 of tube fitting 14. Lower bearing surface 92 faces, and is shown spaced from, step bearing surface 73 of housing 12. But bearing surface 92 can bear on surface 73 when seal 22 is properly seated with suitable pressure from flange 42.

Cap bearing element 18 has a generally annular form, including an outer perimeter, an inner perimeter, and a circumference extending thereabout. Bearing element 18 has an inner surface 96 facing generally toward upper portion 26 of tube fitting 14, and an outer surface 98 facing generally away from upper portion 26 of tube fitting 14. Inner surface 96 has an upper upright surface 100 facing the outer surface of tube fitting 14, and a lower upright surface 102 facing, and bearing on, remote surface 48 of flange 42. A downwardly-facing surface 104 of bearing element 18 spans the distance between upright surfaces 100 and 102. In the embodiment illustrated, downwardly-facing surface 104 is upwardly concave, spacing surface 104 from top surface 44 of flange 42. Surfaces 100 and 104 define an edge 106 therebetween, having a relatively narrow width which defines a generally one-dimensional line of contact with flange 42 about the annulus of tube fitting 14. A second downwardly-facing surface 108 spans the distance between the inner and outer surfaces at the bottom of bearing element 18. Surface 108 faces, and is spaced from, upper end 60 of housing 12, but surface 108 can bear on upper end 60 when seal 22 is properly seated with suitable pressure from flange 42. Typically, surface 108 contacts upper end 60 and surface 92 contacts surface 73 both at the same time, if at all.

Cap 16 has a generally annular form, including an outer perimeter, an inner perimeter, and a circumference extending thereabout. Cap 16 has an inner surface 110 facing generally toward bearing element 18, an outer surface 112 facing generally away from bearing element 18, a top 114 as part of the outer surface, a bottom surface 116, and an upstanding end surface 118. The configuration of inner surface 110 of cap 16 generally conforms to the configuration of outer surface 98 of cap bearing element 18. The configuration of outer surface 112 generally parallels the configuration of inner surface 110, while providing a generally greater thickness between the inner and outer surfaces at the top 114 of the cap. Bottom surface 116 faces, and is spaced from, upper end 60 of housing 12, but like surface 108 and surface 92, can contact upper end 60 when seal 22 is fully seated in preventing fluid leakage.

An upwardly-facing lower portion 120 of outer surface 112 of cap 16 is angled about 15 degrees from horizontal, and optionally at any angle between about 10 degrees and about 25 degrees from horizontal. Similarly, a downwardly-facing upper portion 122 of outer surface 66 of housing 12 is angled about 5 degrees from horizontal, optionally any angle between about 10 degrees and about 25 degrees from horizontal. Imaginary extensions of the angles of upper and lower portions 120 and 122 intersect each other as illustrated in FIG. 5.

Closure 24, illustrated as a clamp, has an outer-facing surface 124, an inner-facing surface 126, a top 128, and a bottom 130. Inner-facing surface 126 has a first angular portion 132 which generally conforms angularly to surface 120 of cap 16, a second angular portion 134 which generally conforms angularly to surface 122 of housing 12, and an upright surface 136 connecting outwardly-disposed ends of surfaces 132 and 134 and recessed away from both housing 12 and cap 16 in the rotatable joint assembly. Surfaces 132 and 134 are so spaced from each other that, when closure screw 144 is tightened, closure ring 145 is urged toward cap 16 and housing 12 and angular surfaces 132 and 134 of the closure bear on upper and lower portions 120 and 122, urging the cap and housing 12 toward each other, and correspondingly urging tube fitting 14 and housing 12 toward each other.

As closure 24 applies increasing force on the surfaces of upper and lower portions 120 and 122, housing 12 and tube fitting 14 are pushed increasingly closer to each other, thereby applying increasing pressure on seal 22, thus beginning to develop a leakproof seal between housing 12 and tube fitting 14 at the O-ring. FIG. 4 illustrates the relative positioning of the elements of the joint as the pressure is being applied but before a complete seal has been achieved.

Figure 5:
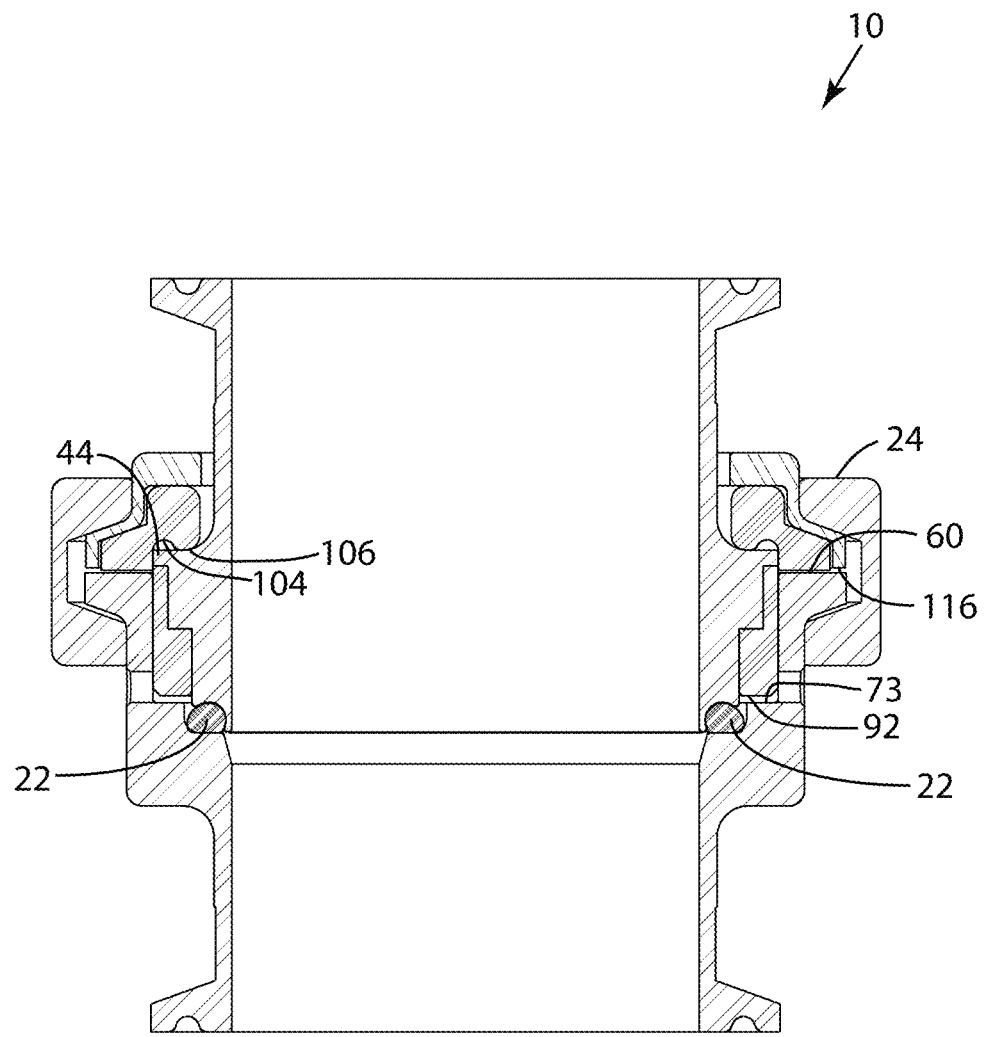
FIG. 5 is the rotatable joint of FIG. 4 showing the joint assembly after final sealing pressure has been applied.

As closure 24 applies still more force, seal 22 is deformed into gap 75 as seen by comparing the right side of FIG. 4, where seal 22 is not yet deformed, and FIG. 5 where seal 22 is so deformed.

Seal surface 56 on tube fitting 14 defines a first magnitude of area of contact with seal 22 about the annulus defined by seal 22. Seal surface 74 on housing 12 defines a second magnitude of area of contact with seal 22 about the annulus defined by seal 22. For example, as illustrated in FIGS. 4 and 5, the first area of contact of tube fitting 14 with seal 22 is greater than the second area of contact of housing 12 with seal 22. The surface finishes of seal 22 surfaces 56 and 74 in the illustrated embodiments are the same such that the static friction per unit area between seal 22 and the respective seal surfaces 56 and 74 is the same for both seal surfaces. A typical such surface finish is about 32 $R_a$. Since the surface area of contact between seal 22 and tube fitting 14 is greater than the surface area of contact between seal 22 and housing 12, and wherein the surface finishes are about the same, whereby static friction per unit area is the same, when tube fitting 14 rotates relative to housing 12, seal 22 preferentially rotates with housing 12 while remaining fixed, and not rotating, relative to tube fitting 14.

Above seal surface 74, inner surface 68 of housing 12 extends upwardly a short distance at a constant diameter, then extends outwardly at step 73, thence upwardly at a constant diameter along upper radial bearing surface 71 to upper end 60 of housing 12. One or more leak detection ports 138 extend through upper portion 58 of housing 12, from upper bearing surface 71 to ambient (atmosphere) at outer surface 66, to provide an indication of any leakage of fluid past seal 22.

Figure 2:
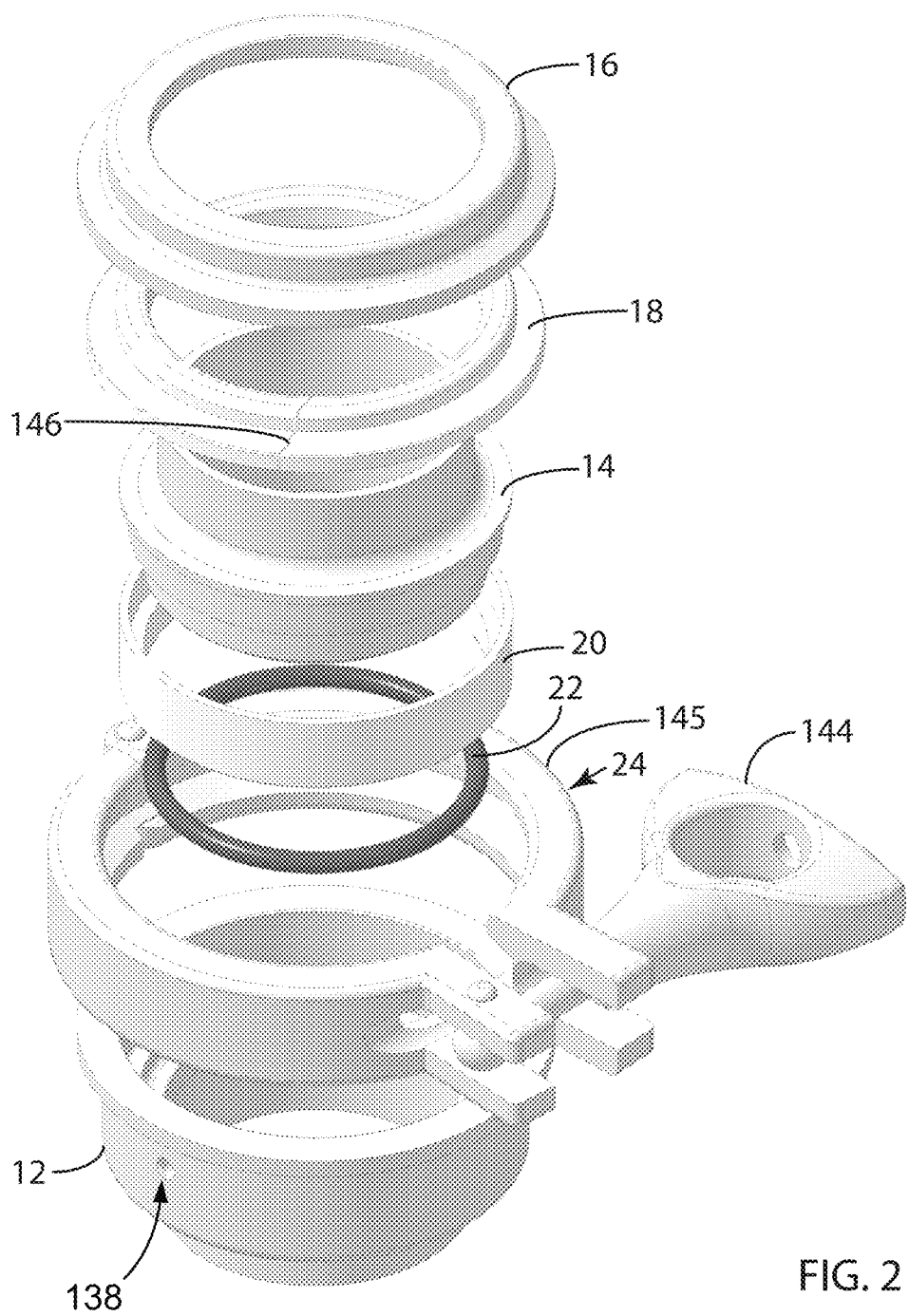
FIG. 2 is a pictorial exploded view of the rotatable joint of FIG. 1.
Figure 6:
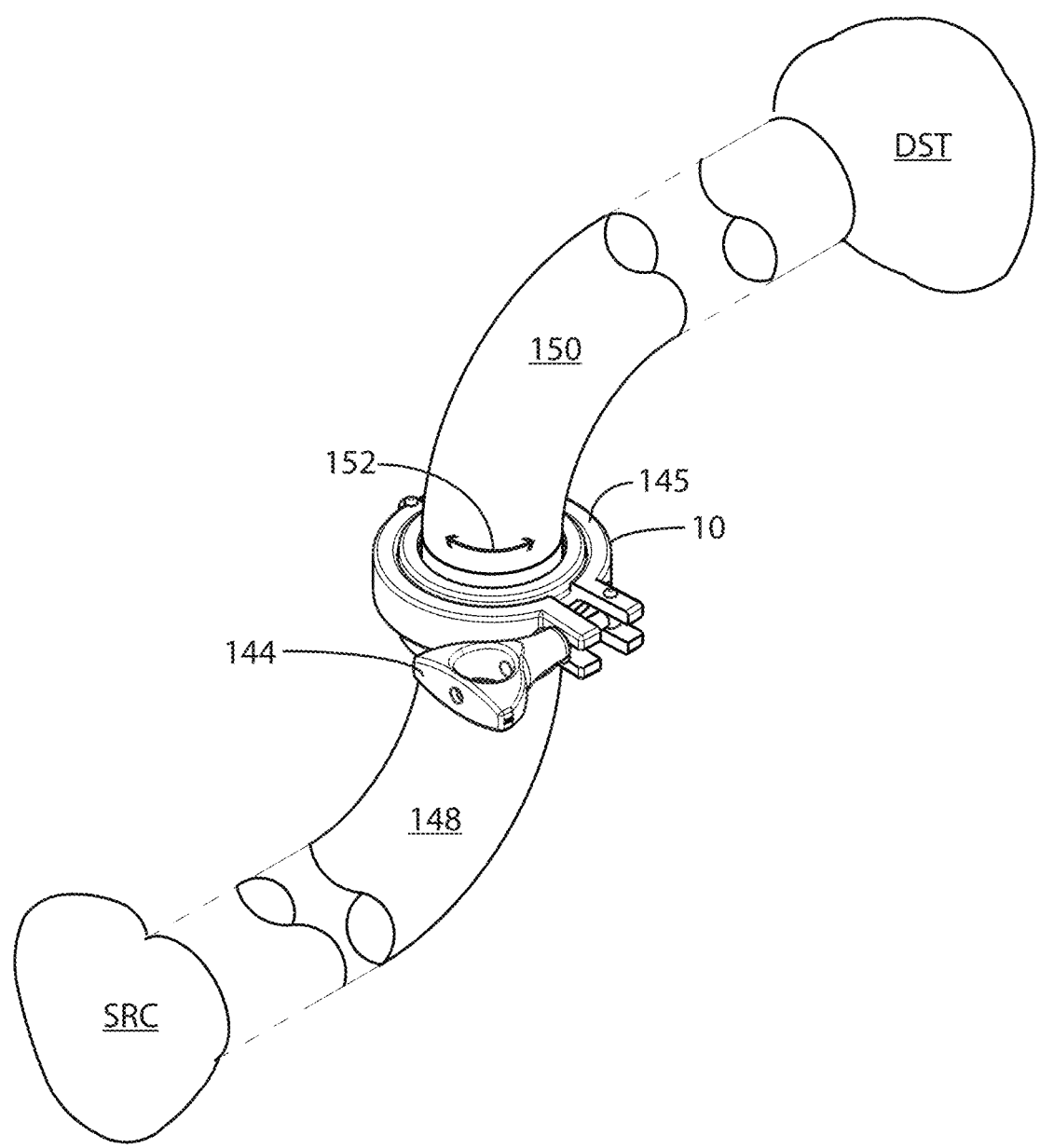
FIG. 6 shows a portion of a piping system in which first and second pipes are joined to each other using a rotatable joint as in FIG. 1.

FIGS. 3-5 show an upper mating flange 140 on tube fitting 14 and a lower mating flange 142 on housing 12. FIGS. 1, 2 and 6 show no such flanges. Flanges 140, 142 are shown only to illustrate an alternative method of interfacing rotatable joint 10 with suitable fluid transfer piping. Such interfacing can be, for example and without limitation, flange connections as shown, or welding as suggested in FIG. 6, as well as other connectivity known in the art. When such flange 140 connection is provide at the upper end of tube fitting 14, cap 16 is installed on upper end 28 of tube fitting 14 and about outer surface 34, before flange 140 is added to the upper end of tube fitting 14 such as by welding.

Cap bearing element 18, which is polymeric and which thus does not tolerate the heat incident to welding, is assembled about outer surface 34 and under cap 16, after flange 140 has been fully formed and finished. To facilitate installing bearing element 18, bearing element 18 is cut through, top-to-bottom, as shown at a cut 146 in FIGS. 2 and 3. Cut 146 allows bearing element 18 to be resiliently expanded over larger circumference elements such as upper flange 140 and cap 16 when rotatable joint 10 is being assembled.

Housing 12, tube fitting 14, cap 16 and closure 24 are made of relatively harder, more dimensionally-stable food grade materials such as, for example and without limitation, stainless steel. Cap bearing element 18 and housing bearing element 20 are made of relatively softer, more resilient wear materials such as, for example and without limitation, polytetrafluoroethylene (PTFE), polyetheretherketone (PEEK) or polyvinylidene fluoride (PVDF), all known as materials compatible for use in food processing, pharmaceutical processing, and any process requiring a "clean-room" environment. Accordingly, wear in rotatable joint 10 is selectively focused on bearing elements 18 and 20 and rubber seal 22, whereby wear in rotatable joint 10 can be accommodated by periodically, at appropriate intervals, replacing bearing elements 18 and 20 and seal 22.

With rotatable joint 10 assembled as illustrated in FIGS. 1, 4, 5 and 6, tube fitting 14 and housing 12 can be rotated about common axis 78 relative to each other while seal 22 prevents leakage of fluid past seal cavity 76.

Housing bearing element 20 is mounted over tube fitting 14 on a diameter just above seal 22 and isolates tube fitting 14 from housing 12, allowing tube fitting 14 to rotate about common longitudinal axis 78. Cap bearing element 18 is assembled over tube fitting 14 and is supported by flange 42. Flange 42 is located at a distance along longitudinal axis 78, abutting housing bearing element 20 with cap bearing element 18 abutting the opposite side of flange 42. Cap bearing element 18 is designed and assembled to cause minimal friction on tube fitting 14, thus allowing tube fitting 14 to rotate freely about longitudinal axis 78 relative to housing 12.

When fluid is passed through the assembled tube fitting and housing, seal 22 confines the fluid inwardly of fluid-contacting surfaces 38 and 72, allowing no intrusion from outside atmosphere or leakage of fluid past seal 22 to the outer surfaces of either tube fitting 14 or housing 12.

All inner surfaces, namely fluid-contacting surfaces 38 and 72, in contact with any fluid, are aligned such that the fluid-contacting surfaces can be cleaned in place (CIP). Leak detection ports 138 in housing 12 serve to indicate when seal 22 has been compromised.

An outer portion of tube fitting 14 defines flange 42 which is adjacent bearing surface 50 of tube fitting 14. Housing bearing element 20 is assembled over bearing surfaces 50 and 54, as well as over step 52, and abuts bottom surface 46 of flange 42. After bearing element 20 has been installed on tube fitting 14, seal 22 is installed on seal surface 56 of tube fitting 14, just below lower bearing surface 92 of the bearing element. The outer diameter of seal 22, as installed at seal surface 56 on tube fitting 14, is slightly greater than the outer diameter of bearing element 20, whereby seal 22 prevents bearing element 20 from sliding downwardly past seal 22. The respective sub-assembly of tube fitting 14, bearing element 20 and seal 22 is then installed into housing 12 until seal 22 abuts seal surface 74 in housing 12. Cap bearing element 18 is then installed around tube fitting 14 and abutting top surface 44 of flange 42. Cap 16, if not previously installed, is then installed over the top of tube fitting 14, downwardly toward flange 42, and into abutment with the top of cap bearing element 18. A closure, such as clamp 24, is then installed about the angled surfaces 120 and 122 of cap 16 and housing 12 to secure the assembly as one unit. Pressure is applied urging housing 12 and tube fitting 14 toward each other as needed in order to drive seal 22 into gap 75.

The lateral displacement of the upper portion of fluid-contacting surface 72 of housing 12 from fluid contacting surface 72 at finger 57 creates a localized line of 5 turbulence about the circumference of the joint at gap 75. Such localized turbulence helps in cleaning residual product from the area of gap 75 during a clean-in-place operation.

The distance between finger 57 and the top of fluid contacting surface 72, namely across gap 75, needs to be great enough to avoid contact between finger 57 and fluid contacting surface 72 during or after the process of assembling joint 10, while being small enough to discourage retention of residual product during a clean-in-place operation. A typical closest-approach dimension for gap 75 is about 0.015 in (inches), with a range of about 0.01 in to about 0.04 in, optionally about 0.015 in to about 0.03 in.

Figure 7:
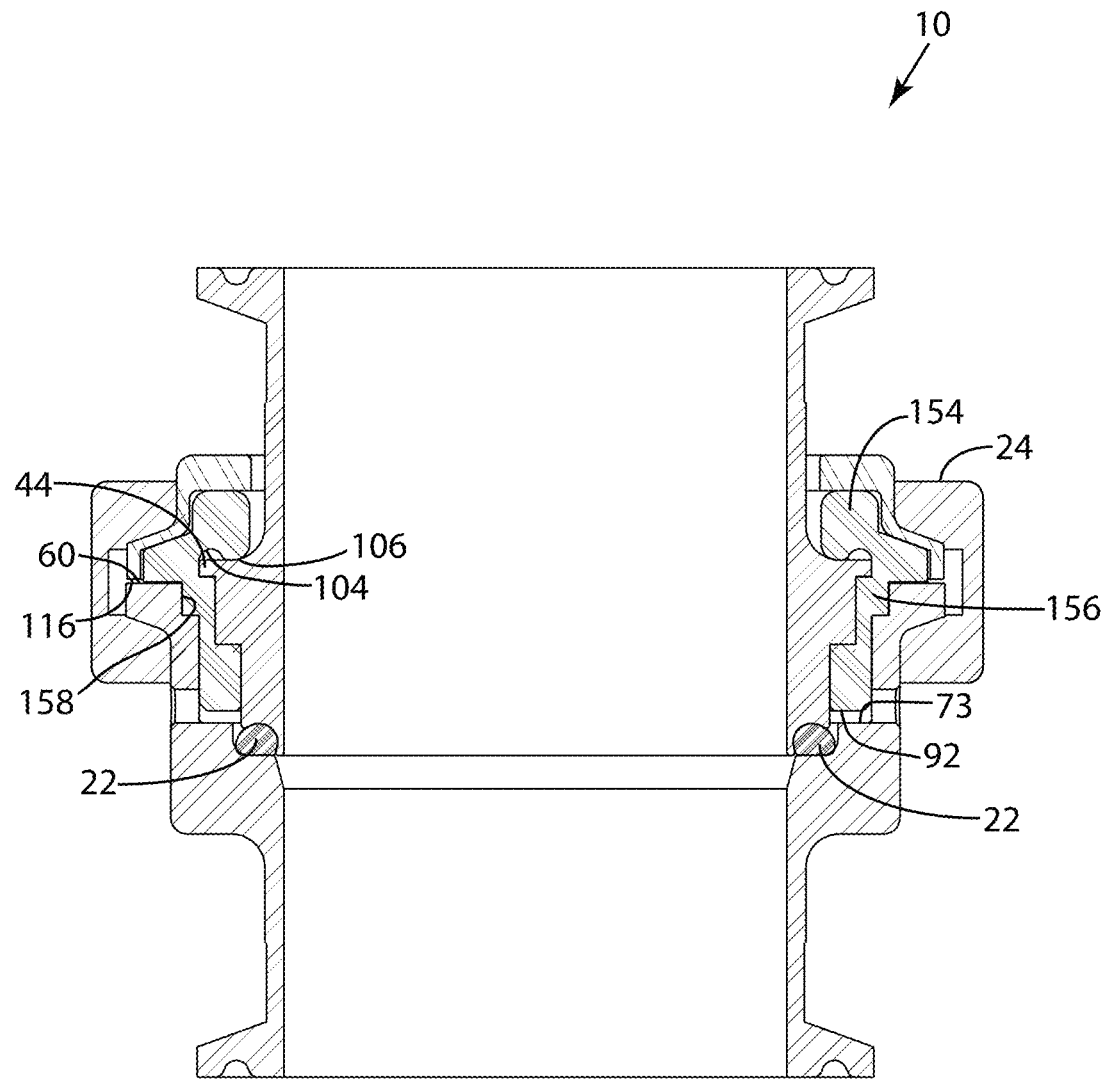
FIG. 7 shows a cross-section as in FIG. 5 but employing a single unitary bearing structure for the first and second bearing elements.

FIG. 7 illustrates use of a single, unitary, bearing structure 154 to provide bearing surfaces to both housing 12 and tube fitting 14. A cut 146 extends the full height of bearing structure 154 to facilitate assembly of the bearing structure to tube fitting 14. Such bearing structure is assembled to tube fitting 14 before tube fitting 14 is assembled to housing 12. Bearing structure 154 has essentially the same structures and surfaces as bearing elements 18 and 20, with the addition of a bridge 156 connecting the structures of previous bearing elements 18 and 20. A corresponding recess 158 has been provided at upper end 60 of housing 12 to receive bridge 156.

As seen in, for example, FIGS. 1, 2 and 3, the illustrated closure 24 has first and second arms 160A, 160B joined together at proximal ends of the respective arms such that first and second arms 160A and 160B can pivot with respect to each other about a joint 162. Arms 160A and 160B can pivot to either an open position or a closed position. In the closed position, the remote ends of arms 160A and 160B approach each other, and arms 160A and 160B may be closed and clamped about housing 12 and tube fitting 14 and secured by screw 144.

When closure 24 is opened to release tube fitting 14 and housing 12 from each other, the end of screw 144 remote from a pivot pin 164 (see FIG. 1) is pivoted about pivot pin 164 and away from housing 12. When closure 24 is used to apply closing force to the joint 10, screw 144 is rotated about pivot pin 164 into the closing position shown in FIG. 1. With screw 144 in the closing position, a screw handle 166 of screw 144 is rotated with respect to a threaded shaft 168 which is secured to pivot pin 164, pivot pin 164 being mounted for pivoting movement with respect to the remote end of arm 160A. Screw handle 166 extends through a slot 170 in the remote end of arm 160B and bears on an end of arm 160B adjacent slot 170. As handle 166 is rotated, handle 166 is drawn by threaded shaft 168 toward pivot pin 164, thus drawing the remote ends of arms 160A and 160B together, and accordingly applying closing force on closure 24, such closing force being transmitted to housing 12 and cap 16. The degree of clamping force applied by closure 24 is controlled by the amount of force applied by screw 144 in advancing the closing action of closure 24. As illustrated in FIG. 1, even in the "closed" condition there is typically an open space 172 between the remote ends of arms 160A and 160B.

Figure 8:
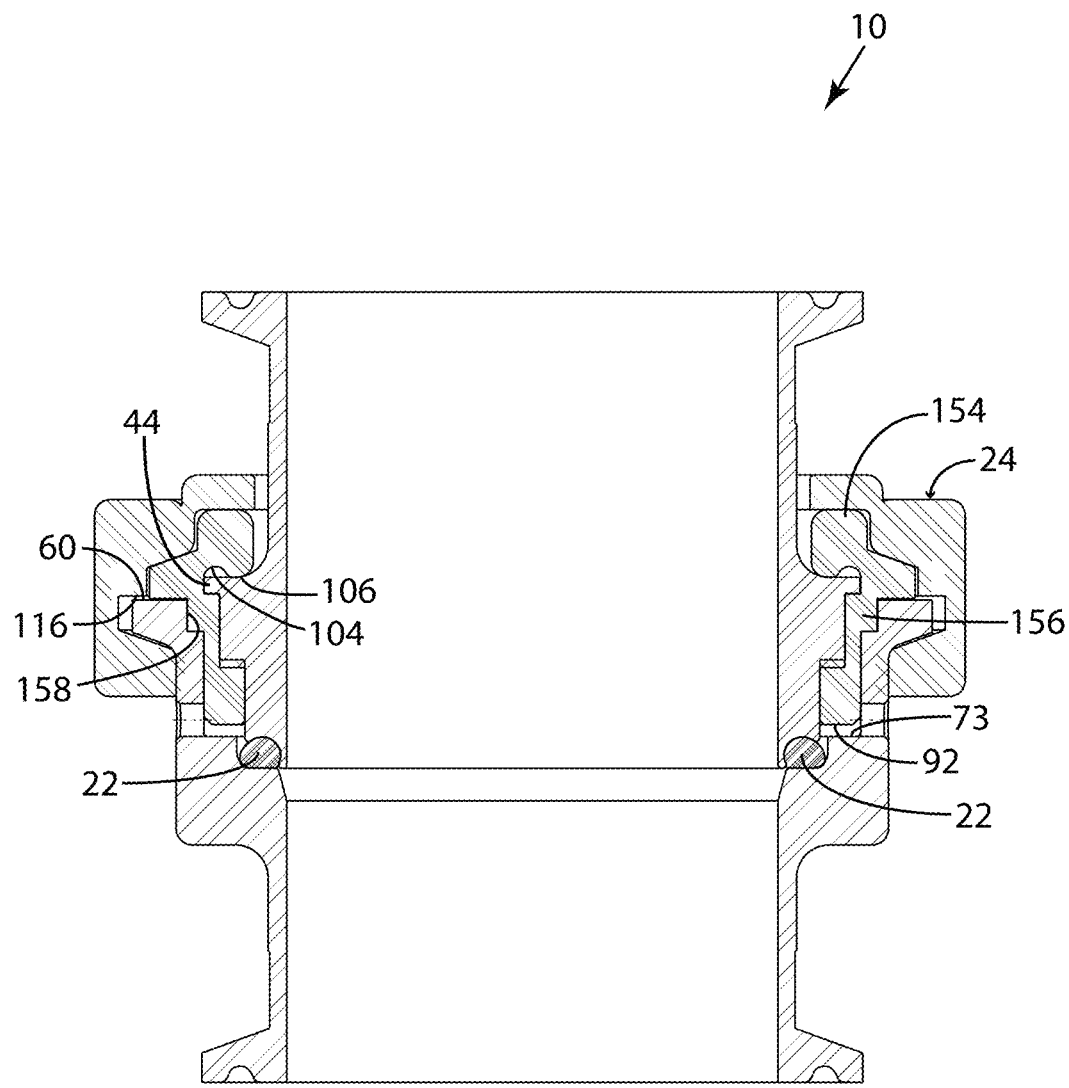
FIG. 8 shows a cross-section, as in FIG. 7, in which the cap has been merged into the closure.

FIG. 8 illustrates yet another embodiment of the invention wherein the structure of the cap has been merged into closure 24. With the cap structure so merged into closure 24, open space 172 extends to the structure which represents what was cap 16 in the other embodiments, and thus extends entirely through the top-to-bottom height of the resulting closure 24. Accordingly, the resulting combined closure structure 24 is mounted to the housing/tube fitting subassembly at the same time as closure 24 was mounted to the embodiments which include cap 16 as a separate element, whereby the cap structure and the closure structure, as a unitary structure, are mounted to the housing/tube fitting subassembly simultaneously (as a single unitary structure).

For some applications, bolted flanges can be substituted in place of clamp-type closure 24. Also, corrosion resistant balls or rollers can be used instead of sleeves at any of the bearing points.

Either of tube fitting 14 or housing 12 can serve as the rotating element of rotatable joint 10 while the other of tube fitting 14 or housing 12 serves as the stationary component. This is easily dictated based on how rotatable joint 10 is attached in the piping system.

Method of Use

The rotatable joint of the invention is typically used in a piping system which includes more than one fluid source SRC and/or more than one fluid destination DST, where fluid is transferred from multiple sources and/or to multiple destinations, or both. A typical such fluid transfer transfers fluid from a single source to a single destination at any given point in time. However, concurrent transfer from multiple sources is contemplated. Similarly, concurrent transfer to multiple destinations is contemplated, including concurrent withdrawal of fluid from multiple sources and concurrent delivery of such fluid to multiple destinations, optionally all passing through a single rotatable joint 10.

To use a rotatable joint of the invention, the lower end of housing 12 is connected to a first pipe 148 in the piping system and the upper end of tube fitting 14 is connected to a second pipe 150 in the piping system, as illustrated in FIG. 6, using the connection method of choice. FIG. 6 shows the pipes welded to housing 12 and tube fitting 14. Other connection methods such as clamping, threading, compression connectors and the like are known in the art. Once connected to the pipe or tube system, a fluid transfer process can be effected wherein fluid is withdrawn from one or more sources SRC, passes through one or more pipes and enters joint 10 through a first pipe such as pipe 148, passes through joint 10, and exits joint 10 from which the fluid passes into a second pipe such as pipe 150. The fluid then travels through pipe 150, optionally through additional piping, to one or more destinations DST. Once the fluid transfer has been completed, the piping system which was used for the just-completed fluid transfer, including joint 10, is cleaned in place to remove all residual product fluid. Then, one or more of the pipes is/are disconnected from one or more of the sources or destinations which have been connected to the piping system, and such pipe or pipes is/are re-directed, and connected, to a different source or sources, or different destination or destinations, in preparation for a subsequent fluid transfer. As the piping is re-directed, angular rotation of pipe 150 relative to pipe 148 is effected as needed at rotatable joint 10 as indicated by the double-headed arrow 152.

Referring again to FIG. 5, as tube fitting 14 rotates relative to housing 12, seal 22 maintains the leakproof character of joint 10; and polymeric bearing elements 18 and 20 provide sliding interfaces against which the metal of tube fitting 14 and housing 12 can slide as housing 12 and tube fitting 14 move/rotate relative to each other, all as closure 24 maintains closing force urging housing 12 and tube fitting 14 toward each other thus ensuring adequate force on seal 22 at cavity 76 to maintain a fluid-tight seal. The narrow width of edge 106 limits the magnitude of the sliding friction between bearing 18 and tube fitting 14.

Once the moved pipe or pipes have been connected to the different source(s) and destination(s), a subsequent fluid transfer can be effected from a given source, through pipes 148, 150, through rotatable joint 10, to a given destination, wherein at least one of the sources and/or destinations is different from a source or destination used in the previous fluid transfer.

While the principles of this invention have been described in connection with specific embodiments, it should be understood clearly that these descriptions are made only by way of example and are not intended to limit the scope of the invention.

The invention claimed is:

1. In a rotatable joint for fluid flow therethrough having (a) a housing, (b) a tube fitting axially aligned with the housing, (c) a bearing around the tube fitting and configured to permit relative rotation of the housing and tube fitting, and (d) a seal between the housing and tube fitting, the seal having a diameter, the improvement wherein:

the tube fitting includes a tube-fitting seal surface and the housing includes a housing seal surface;

the seal includes a fluid-flow side and an atmosphere side;

the housing and tube fitting are configured for clean-in-place operations wherein:

the housing seal surface and tube-fitting seal surface form a circumferential gap therebetween at the fluid-flow side of the seal;

the housing includes a chamfer adjacent to the housing seal surface, the chamfer forming a portion of the circumferential gap which gap narrows toward the seal; and the housing includes one or more leak detection ports being adjacent to the seal and radially opens to the atmosphere, whereby (1) any leakage of fluid through the rotatable joint flows around the seal through one or more of the leak detection ports to the atmosphere without passing through the bearing, and (2) a localized line of turbulence is created about the circumferential gap during cleaning-in-place.

2. The rotatable joint of claim 1 wherein the circumferential gap is between 0.01 and 0.04 inches at its narrowest point.

3. The rotatable joint of claim 2 wherein the circumferential gap is about 0.015 inches at its narrowest point.

4. The rotatable joint of claim 1 wherein the bearing includes (a) an outer bearing surface of the tube fitting having a diameter, (b) an inner bearing surface of the housing, and (c) a first bearing element positioned between the outer bearing surface of the tube fitting and the inner bearing surface of the housing.

5. The rotatable joint of claim 4 wherein the diameter of the outer bearing surface of the tube fitting is at least as large as the diameter of the seal.

6. The rotatable joint of claim 4 wherein the first bearing element is of polymeric material.

7. The rotatable joint of claim 4 wherein the bearing further includes (a) an upper bearing surface of the tube fitting substantially perpendicular to the outer bearing surface of the tube fitting, (b) an upper bearing surface of the housing substantially perpendicular to the inner bearing surface of the housing, (c) a second bearing element configured and positioned to contact both the upper bearing surface of the tube fitting and the upper bearing surface of the housing, and (d) a cap surrounding the second bearing element.

8. The rotatable joint of claim 7 wherein the second bearing element is made of polymeric material.

9. The rotatable joint of claim 7 wherein the second bearing element includes a cut to facilitate installation.

10. The rotatable joint of claim 7 further including a closure surrounding the second bearing element and the housing and holding the cap on the joint.

11. The rotatable joint of claim 10 wherein the unitary bearing element includes a cut to facilitate installation.

12. The rotatable joint of claim 10 wherein the unitary bearing element is of polymeric material.

13. The rotatable joint of claim 10 wherein the cap and closure are a unitary bearing structure.

14. The rotatable joint of claim 7 wherein the first and second bearing elements are a unitary bearing element.

* * * * *